United States Patent
Guthrie et al.

(10) Patent No.: US 6,950,909 B2
(45) Date of Patent: Sep. 27, 2005

(54) SYSTEM AND METHOD FOR REDUCING CONTENTION IN A MULTI-SECTORED CACHE

(75) Inventors: Guy Lynn Guthrie, Austin, TX (US); Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 10/424,645

(22) Filed: Apr. 28, 2003

(65) Prior Publication Data

US 2004/0215900 A1 Oct. 28, 2004

(51) Int. Cl.[7] .............................................. G06F 12/00
(52) U.S. Cl. .................... 711/146; 711/141; 711/168; 711/169
(58) Field of Search ................................ 711/118, 119, 711/141, 120, 168–169

(56) References Cited

U.S. PATENT DOCUMENTS

| | | | |
|---|---|---|---|
| 6,118,608 A | * | 9/2000 | Kakihara et al. ............. 360/53 |
| 6,434,668 B1 | * | 8/2002 | Arimilli et al. ............. 711/128 |
| 6,442,653 B1 | * | 8/2002 | Arimilli et al. ............. 711/141 |
| 6,687,795 B2 | * | 2/2004 | Arimilli et al. ............. 711/146 |

* cited by examiner

Primary Examiner—Mano Padmanabhan
Assistant Examiner—Jasmine Song
(74) Attorney, Agent, or Firm—Casimer K. Salys; Dillon & Yudell LLP

(57) ABSTRACT

A cache access mechanism/system for reducing contention in a multi-sectored cache via serialization of overlapping write accesses to different blocks of a cache line to enable accurate cache directory updates. When a first queue issues a write access request for a first block of a cache line, the first queue concurrently asserts a last_in_line signal identifying the first queue as the last sequential queue to request access to that cache line. If there is an active write access requests for the cache line, the first queue undertakes a series of operations to enable sequentially correct updates to the cache directory with all previous updates taken into consideration. Included in these operations are tracking the completion of the write access and the corresponding write to the associated cache directory and copying the cache directory state to be updated from the parent queue (rather than from the cache directory) so that the parent queue's update of the directory state is included (and not overwritten) when the first queue writes to the directory. The correct cache directory state is then stored within the associated cache directory.

8 Claims, 7 Drawing Sheets

SYSTEM AND METHOD FOR REDUCING CONTENTION IN A MULTI-SECTORED CACHE

BACKGROUND OF THE INVENTION

1. Technical Field

The present invention relates generally to data processing and more specifically to cache access mechanisms in data processing systems. Still more particularly, the present invention relates to cache access mechanisms that reduce contention in a multi-sectored cache.

2. Description of the Related Art

A conventional multiprocessor data processing system may comprise a system bus to which a system memory and a number of processing units that may each include a processor and one or more levels of cache memory are coupled. Caches are temporary storage facilities utilized to store subsets of the overall memory of a data processing system at varying latencies. At the various levels of a cache hierarchy, a tradeoff is made between the size and the access latency of the cache at the given hierarchy level. The cache most directly coupled to a processing unit, typically referred to as an "L1" cache, usually has the lowest latency but at the cost of also being the smallest of the various caches. Likewise, the cache at the lowest level of the hierarchy usually has a larger storage capacity, often one or two orders of magnitude larger that the L1 cache, but at a higher access latency.

It is often the case, though not required, that the cache at a lower level of the cache hierarchy contains a copy of all the data contained in the caches at higher levels of the cache hierarchy. This property is known as "inclusion" and necessarily leads to the condition that a cache at a lower level of the cache hierarchy be at least as large as the cache at the next higher level of the hierarchy in order to allow the lower level cache to include the contents of memory cached at the next higher level. Those skilled in the art are familiar with the notion of constructing a multi-level cache hierarchy that optimizes the access latency and size characteristics of the various cache hierarchy levels according to available implementation technologies, leading to optimal system performance.

A cache, at a given level of hierarchy, is typically comprised of a number of components often including a cache directory array, a cache data array, and those functional logic units necessary to update and manage the cache. The cache data array portion of a cache is a set of data storage elements utilized to store copies of portions of main memory. The cache data array is divided into a series of so called "cache blocks". These cache blocks are storage regions utilized to hold copies of contiguous portions of the main memory within the data processing system. These blocks are typically on the order of 128 bytes in size and are further arranged into groups, known as "sets", of usually 8 to 16 blocks. The overall cache data array consists of a number of these sets. When placing a portion of memory within the cache, some number of the bits of the address of the block of memory are typically utilized to index into the various cache sets to determine a set within which to place the block of memory. That is to say, each contiguous aligned portion of main memory within the data processing system maps to a particular set. Within the cache set, various allocation policies are utilized to pick which member among the members within the set to place the block. In summary, the cache data array is divided into multiple cache sets which contain multiple cache blocks. Any given block in memory is typically allocated to some selected block within a particular set chosen by a mapping function of some of the address bits corresponding to the address of the block in main memory.

The cache further typically includes a cache directory array. This array consists of bookkeeping information detailing which portions of the overall data processing system memory and their processing states that are currently present within the cache. Typically, each block within the cache data array also has a corresponding entry within the cache directory array detailing which portion of main memory and its processing state is present in that cache data block. Each directory entry usually consists of a number of fields possibly including a TAG field, a STATE field, an LRU field, and an INCLUSION field. Further, an ECC field that provides error correction and detection against bit errors in any of the fields in the directory entry is also typically provided.

The TAG field within the directory entry corresponds to those high order address bits necessary to determine which block within the main memory is present within the cache data array entry associated with this directory entry. The TAG field typically represents the majority of the bits within a cache directory entry. The STATE field typically indicates the processing state of the cache line. For example, this field is often used to maintain the cache coherence state of the cache block according to some cache coherence protocol such as the well known "MESI" protocol. The LRU typically contains information about recent accesses to the cache line and is used to guide the cache block replacement policy when cache blocks of new addresses are allocated within the cache set. Finally, the inclusion field often indicates whether or not the current cache block is present in a higher level cache. Those skilled in the art will appreciate that the format and contents of the directory entry discussed here is but one representative format possible.

In order to allow for larger lower level caches without dramatically adding to cache directory array overhead, a technique known as "sectoring" is often employed. In sectoring, the cache blocks in a lower level cache often consist of a number of different "sectors". That is to say, in the lower level cache, the cache blocks as described above are further divided into two or more like-sized sub-regions. These sectors are typically equal in size to the cache block size of the cache immediately above the current cache in the cache hierarchy.

Furthermore, each of the sectors can typically be manipulated and managed individually. For example, one sector of a cache block could be present in the lower level cache and the other sector could be not present. To support independent processing of the various sectors, the directory entry is usually reformatted to include STATE fields for each individual sector. Importantly, the single TAG field within the cache directory entry, which dominates the size of the cache directory entry, now corresponds to a larger cache block. In other words, a similar number of directory entries with additional STATE fields per sector can support a larger cache in the same cache directory area than would be possible with a non-sectored implementation that would require an additional TAG field for each sector.

Finally, the cache also contains functional logic queues that consist of the functional logic necessary to update the cache, provide data to higher level caches or the processing unit(s), and honor snooped requests from either the system interconnect or lower level caches. These functional queues are typically divided into two classes of queues: Read Queues and Snoop queues, which process requests from higher level caches or the processing unit(s) or from the system interconnect or lower level caches, respectively. As part of their function, these queues are responsible for updating the cache data and directory arrays. In a sectored cache, a conflict often arises when multiple queues wish to operate on the independent sectors within a cache block. Since multiple state fields are present, uncontrolled writes to the directory entry by differing queues operating on the cache block sectors can lead to corrupted state fields.

In order to prevent such contention, data processing systems have often required that only one queue be active within a given cache block. While this constraint helps ensure the correctness of updates to the various state fields within the directory entry, this technique can lead to lower system performance and/or error conditions. If a system prevents more than one queue from operating simultaneously within a cache block, an opportunity for overlapped processing is lost, increasing the overall system latency and decreasing performance. Also, for snoop queues, allowing only one active queue per directory entry leads to many operations having to be retried again at a later time. These retried operations can lead to system livelocks and deadlocks that should be avoided where possible.

The present invention recognizes that the conventional queue processing of sectored cache directories is subject to a number of inefficiencies and can potentially lead to incorrect or degraded system operation. Therefore, the present invention provides a means by which multiple queues may coordinate overlapping updates to a common directory entry within a sectored cache directory array. These and other benefits are provided by the invention described herein.

SUMMARY OF THE INVENTION

Disclosed is a cache access mechanism/system for reducing contention in a multi-sectored cache. The multi-sectored cache comprises sectored arrays of cache lines and associated cache directories and a cache controller that includes a plurality of queues for read/write access to cache lines within sectored arrays. The system enables serialization of overlapping write accesses to different blocks of a cache line to enable accurate cache directory updates. A first queue issues a write access request for a first block of a cache line. Once the request is issued, the first queue concurrently asserts a last_in_line signal identifying that the first queue is the last sequential queue to request access to that cache line. The first queue also receives an input signal indicating whether a second queue has a preceding write access request for a second block of the cache line sequentially ahead of the request of the first queue and which has not yet completed updating the cache line and/or directory. When this condition is true, the second queue is considered a parent queue and has to complete all operations before the first queue can proceed with updating the cache directory.

If there are no outstanding write access requests for the directory, the first queue proceeds with a write to the cache line and a corresponding entry of the associated cache directory utilizing current directory information. However, if there is an outstanding write access requests for the cache line, the first queue undertakes a series of operations to enable sequentially correct updates to the cache directory with all previous updates taken into consideration. These operations involve: tracking the completion of the parent queue's write access and a corresponding write to the associated cache directory; copying the cache directory state to be updated from the parent queue (rather than from the cache directory) so that the parent queue's update of the directory state is included (and not overwritten) when the first queue writes to the directory; and modifying the cache directory state to reflect the change being made by the write access of the first queue. The correct cache directory state is then stored within the associated cache directory.

If during the above processing, another queue initiates a write access for the same cache line, the first queue de-asserts the last in line signal. Also, the first queue asserts a BUSY signal when the dispatch operation is initially issued and asserts a directory write BUSY signal in order to write to the directory (when there are no parent queues writing to the directory or when the directory write operation of the parent queue completes). The directory write BUSY signal is de-asserted when a directory write of the first queue completes and the BUSY signal is de-asserted all outstanding tasks of the first queue completes.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
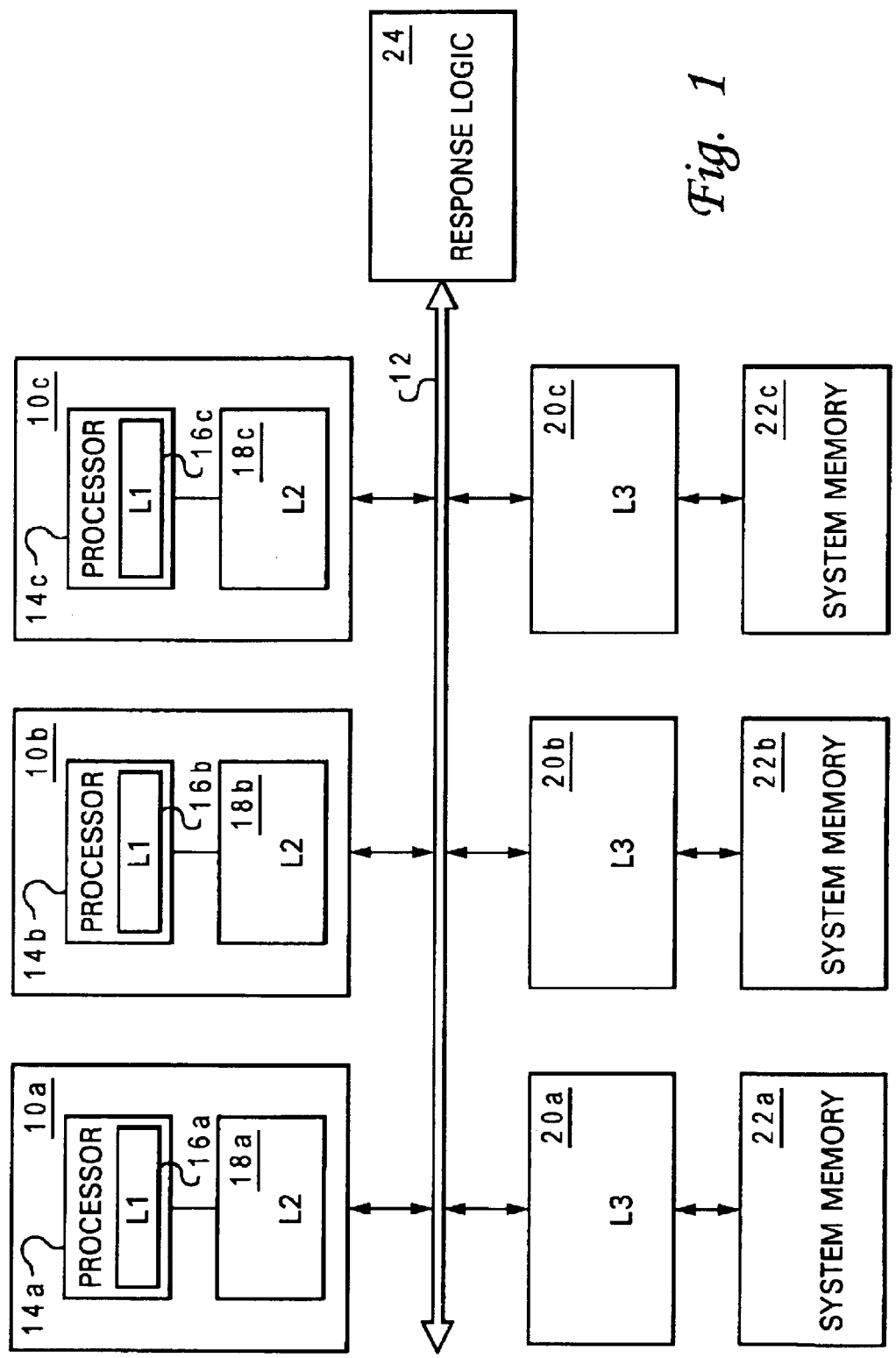
FIG. 1 depicts an illustrative embodiment of a multiprocessor data processing system with which the present invention may advantageously be utilized.

With reference now to the figures and in particular with reference to FIG. 1, there is illustrated a high level block diagram of a first multiprocessor data processing system in accordance with the present invention. As depicted, data processing system 8 includes a number of processing units 10a–10c coupled to a system interconnect 12. Each processing unit 10 is an integrated circuit including one or more processors 14. In addition to the registers, instruction flow logic and execution units utilized to execute program instructions, each of processors 14 also includes an associated level one (L1) cache 16, which temporarily stores instructions and data that are likely to be accessed by the associated processor 14. Although L1 caches 16 are illustrated in FIG. 1 as unified caches that store both instruction and data (both referred to hereinafter simply as data), those skilled in the art will appreciate that each of L1 caches 16 could alternatively be implemented as bifurcated instruction and data caches.

As further illustrated in FIG. 1, the memory hierarchy of data processing system 8 also includes distributed system memories 22, which form the lowest level of volatile data storage in the memory hierarchy, and one or more lower levels of cache memory, such as on-chip level two (L2) caches 18 and off-chip L3 caches 20, which are utilized to stage data from system memories 22 to processors 14. As understood by those skilled in the art, each succeeding lower level of the memory hierarchy is typically capable of storing a larger amount of data than higher levels, but at a higher access latency. For example, in an exemplary embodiment, L1 caches 16 may each have 512 64-byte cache lines for a total storage capacity of 32 kilobytes (kB), all at single cycle latency. L2 caches 18 may each have 2048 128-byte cache lines for a total storage capacity of 256 kB at approximately 10 cycle latency. L3 caches 20 may each have 4096 256-byte cache lines for a total storage capacity of 1 MB, at a latency of approximately 40–60 cycles. Finally, each system memory 22 can store tens or hundreds of megabytes of data at an even longer latency, for example, 300–400 cycles. Given the large disparity in access latencies between the various levels of the memory hierarchy, it is advantageous to reduce accesses to lower levels of the memory hierarchy and, in particular, to system memories 22.

System interconnect 12, which can comprise one or more buses or a cross-point switch, serves as a conduit for communicating transactions between processing units 10 and other snoopers (e.g., L3 caches 20) coupled to system interconnect 12. A typical transaction on system interconnect 12 begins with a request, which may include a transaction field indicating the type of transaction, source and destination tags indicating the source and intended recipient (s) of the transaction, respectively, and an address and/or data. Each device connected to system interconnect 12 preferably snoops all transactions on system interconnect 12 and, if appropriate, responds to the request with a snoop response. Such snoop responses are received and compiled by response logic 24, which provides a combined response indicating what action, if any, each snooper is to take in response to the request. These actions may include sourcing data on system interconnect 12, storing data provided by the requesting snooper, etc.

Those skilled in the art will appreciate that data processing system 8 can include many additional components, such as bridges to additional interconnects, I/O devices, non-volatile storage, and ports for connection to networks or attached devices, etc. Because such additional components are not necessary for an understanding of the present invention, they are not illustrated in FIG. 1 or discussed further herein.

Figure 2:
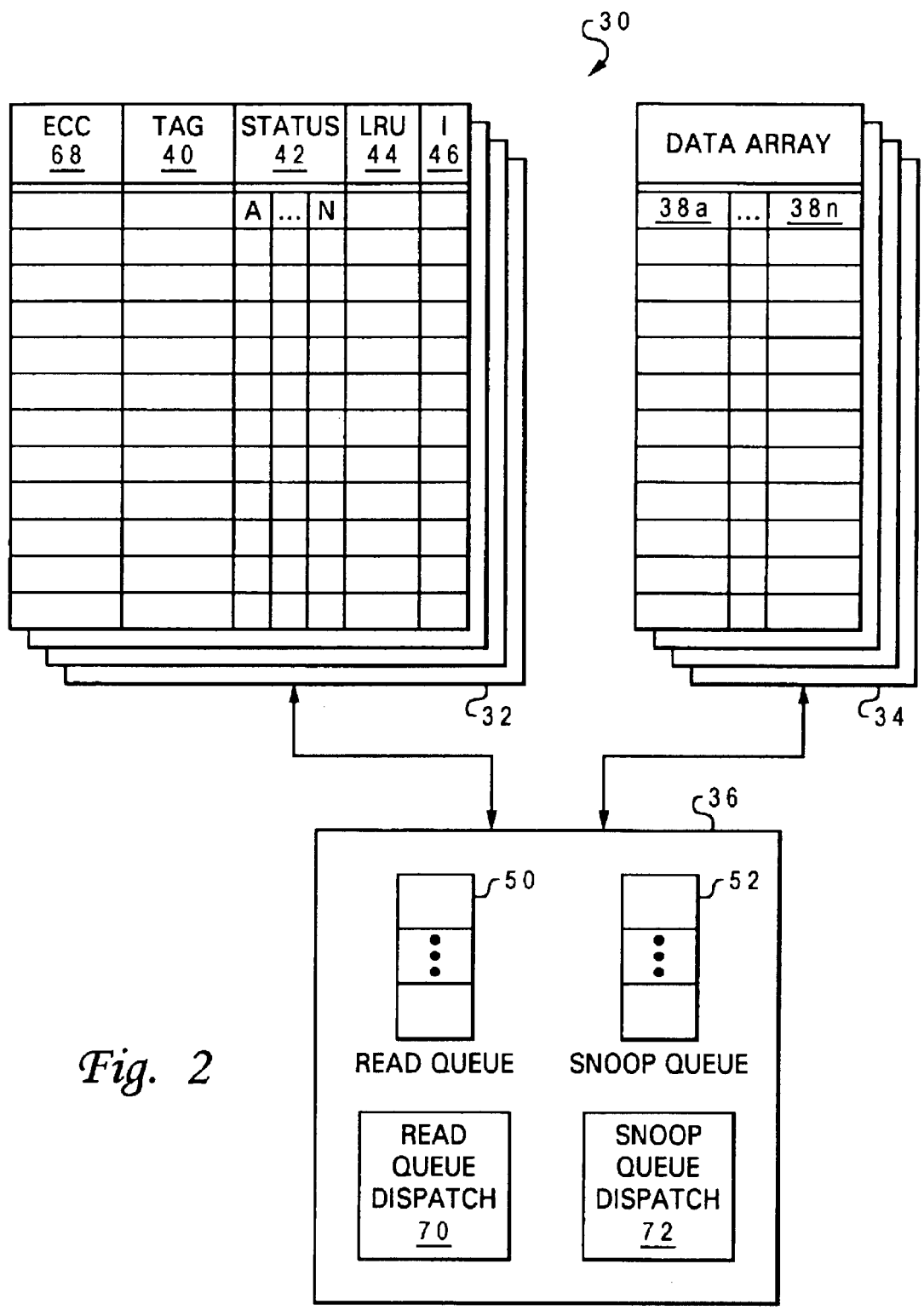
FIG. 2 is a high level block diagram of a multi-sectored cache in accordance with the present invention.

With reference now to FIG. 2, there is depicted a more detailed block diagram of an illustrative embodiment of a cache 30 that may be utilized to implement any of L1 caches 16, L2 caches 18 and L3 caches 20 in accordance with the present invention. In the illustrative embodiment, cache 30 is a four-way set associative cache including a directory array 32, a data array 34, and a cache controller 36. Accordingly, data array 34 of cache 30 comprises a number of congruence classes (or sets) that each contain four ways for storing cache lines. As in conventional set associative caches, memory locations in system memories 22 are mapped to particular congruence classes (or sets) within data array 34 utilizing predetermined index bits within the system memory address.

As further shown in FIG. 2, each cache line within data array 34 is sectored into one or more sectors 38a–38n that can be individually accessed and modified. Although not required by the present invention, it is convenient if the sector size utilized by each cache is the same as the cache line size of the associated higher level cache, if any. For example, if L1 caches 16 have 64-byte cache lines, L2 caches 18 and L3 caches 20 preferably implement 256-byte (four 64-byte sectors) and 512-byte (four 128-byte sectors) cache lines, respectively.

The cache lines stored within data array 34 are recorded in cache directory array 32, which contains one directory entry for each cache block in data array 34. Each directory entry comprises a tag field 40, one or more status fields 42a–n, a least recently used (LRU) field 44, an inclusion field 46, and an ECC field 68. Tag field 40 specifies which cache line is stored in the corresponding block of data array 34 by storing the tag bits of the system memory address of the cache line. Status field 42 separately indicates the coherency and/or consistency status of each sector of the cache line stored in the corresponding block of data array 34 utilizing predefined bit combinations. LRU field 44 indicates how recently the corresponding block of data array 34 has been accessed relative to the other blocks within its congruence class, thereby indicating which cache line should be evicted from the congruence class in case of a cache miss. Inclusion field 46 indicates whether or not each sector of the cache line stored in the corresponding way of data array 34 is also stored in the local memory unit (i.e., cache or system memory) at the next lowest level of the memory hierarchy. Finally, ECC field 68 provides check bits to correct and/or detect soft bit errors within the cache directory entry. It should be noted that an update to any field or subfield within the directory entry requires the re-computation of the ECC field value based on the new values of all the fields in the directory entry.

Still referring to FIG. 2, cache controller 36 manages storage and retrieval of data within data array 34 and updates to cache directory 32 in response to signals received from the associated components of the memory hierarchy and transactions snooped on system interconnect 12. As illustrated, cache controller 36 maintains a read queue 50 and a snoop queue 52 from which cache controller 36 performs updates to cache directory 32 and accesses to data array 34.

In response to a received operation, a snoop or read queue typically performs a number of subtasks, only one of which is updating, if necessary, cache directory array 32. These subtasks can include invalidating higher level cache directories, reading cache data from cache data array 34, and intervening, delivering, or pushing cache data, among others. Certain higher level dependencies often require that these subtasks, including the directory array update, be performed in a certain order with some subtasks not overlapping one another.

Cache Controller 36 also contains read queue dispatch 70 and snoop queue dispatch 72, collectively referred to hereinafter as dispatch logic for read queue 50 and snoop queue 52, respectively. For illustrative purposes, both read queue 50 and snoop queue 52 are hereinafter referred to as a single queue, and those skilled in the art will appreciate that references to the term queue may refer to either one of read queue 50 or snoop queue 52. The dispatch logic is responsible for receiving operations and then determining whether said operations can be placed in a queue for processing and if so which queue. The dispatch logic compares an incoming operation's type and address to, among other things, those operations currently in the queues to determine if any collisions exist. The dispatch logic then, if necessary, issues (dispatches) the operation to a queue for processing.

As part of the processing to dispatch an operation, the dispatch logic consults directory array 32 to obtain the current directory state field 34 values of the cache block targeted by the operation. This state information contains the current state of the cache block at the point of dispatch. However, the current directory state may be out of date relative to any pending directory updates from active queues. In addition, the exact time at which a queue will be able to update directory array 32 is usually not fixed and cannot be determined in advance.

Without active communication between the queues, these conditions can lead to an inconsistent directory state. Consider, for example, a circumstance where two queues are concurrently processing different sectors within a given cache block and furthermore that each of these queues has read the same values for the state fields 42 from the cache directory array 32 at dispatch. In this circumstance, each queue will update the state field for the sector the queue is processing to the new value, but can only update the values of the other state fields to those values initially read from the directory. In this circumstance, after both queues write to cache directory array 32, the status field 42 for the queue that first wrote the cache directory array 32 will be erroneously overwritten back to the original value by the second queue. Thus, in the presence of a sectored directory array, writes to a given directory entry between concurrently operating queues must be coordinated in such a way as to leave the directory array in a consistent state.

As discussed before, this coordination has typically taken the form of a requirement that no more than one queue be active within a given cache block. An alternative solution is to design cache directory array 32 in such a way as to allow the individual status fields 42 to be separately writeable. In this manner, each queue would only alter the state field 42 for the sector being processed by that queue, which would prevent inconsistent overall states due to the writing of stale values into the status fields for sectors not being processed by the current queue. However, such a "separately writeable" cache directory array is impractical in at least two ways. First, the circuit design for separate write enable signals, while possible, presents an additional burden that can be avoided. Second, due to the fact that the ECC field must be recomputed at each write of the cache, a read-modify-write sequence would have to be used for each cache update. The read operation would provide the current value of all the other fields in the cache directory array entry. These values are then combined with the value for the new status field 42 value to be written to the cache directory array to allow the computation of the new value for ECC field 68. Finally, the new cache directory array 32 entry can be written. Performing a read-modify-write sequence for each cache directory array update places an untenable bandwidth burden on the cache directory array.

In contrast, the present invention allows for the concurrent operation of multiple queues within a given sector cache block by an alternate means that does not require a separately writeable cache directory array 32. The present invention achieves this goal by having the various queues communicate amongst themselves information about the status field 42 values for pending cache directory array 32 writes and the actual timing of the completion of these said writes. With this information, the various queues are able to coordinate their activities in such a way as to produce a consistent cache directory array 32 image.

In particular, when a queue is dispatched to process an operation, the queue receives information from associated dispatch logic indicating whether any currently active queue or queues has a cache directory array update pending to the same cache block. If no other queues are currently active within the same cache block, the current queue receives the current state of cache directory array 32. The current queue then forms a new value to write to the cache directory array 32 based on this initial value and the operation being processed. In addition, the current queue signals an indication that it is the "last" queue dispatched to operate within it's given cache line and also indicates the values that will be written to status field 42 within cache directory array 32. Also, the current queue will drive an indication specifying, if necessary, that a directory write is pending which will be de-asserted when the directory write has completed. The current queue will then process all the subtasks, including the update to cache directory array 32, involved in the received operation.

As is typically expected, one or more queues may be currently processing previous operations within the current cache block. In this case, the currently dispatching queue determines and makes note of which other queue is the "last" queue dispatched to operate within the current cache block and the currently dispatching queue also notes the values that will be written to status fields 42 by that other queue. In the following description, this previous "last" queue will be referred to as the "parent" of the current queue. The current queue then forms a new value to write to the cache directory array 32 based on the value the parent queue will write to the directory and the operation being processed. In addition, the current queue signals an indication that it is now the "last" queue dispatched to operate within the current cache line. Likewise, the parent de-asserts its indication that it is the "last" queue.

The current queue will then commence those subtasks involved in the operation being processed that can be overlapped with the other queues. The current queue also delays the cache directory array 32 update until the directory write indication from the parent queue is de-asserted. In this manner, differing queues are allowed to overlap operations to different sectors within a given cache block while still producing consistent directory write updates. These updates are consistent due to the fact that differing queues dispatched to a cache block have their directory writes serialized and further that each queue uses the values written to the directory by its parent queue to form the new value written to cache directory array 32. In this manner any directory value written by a queue takes into account the values of any outstanding pending writes to cache directory array 32 by other queues, and any queue further writes the directory only after these pending writes have completed.

Figure 3:
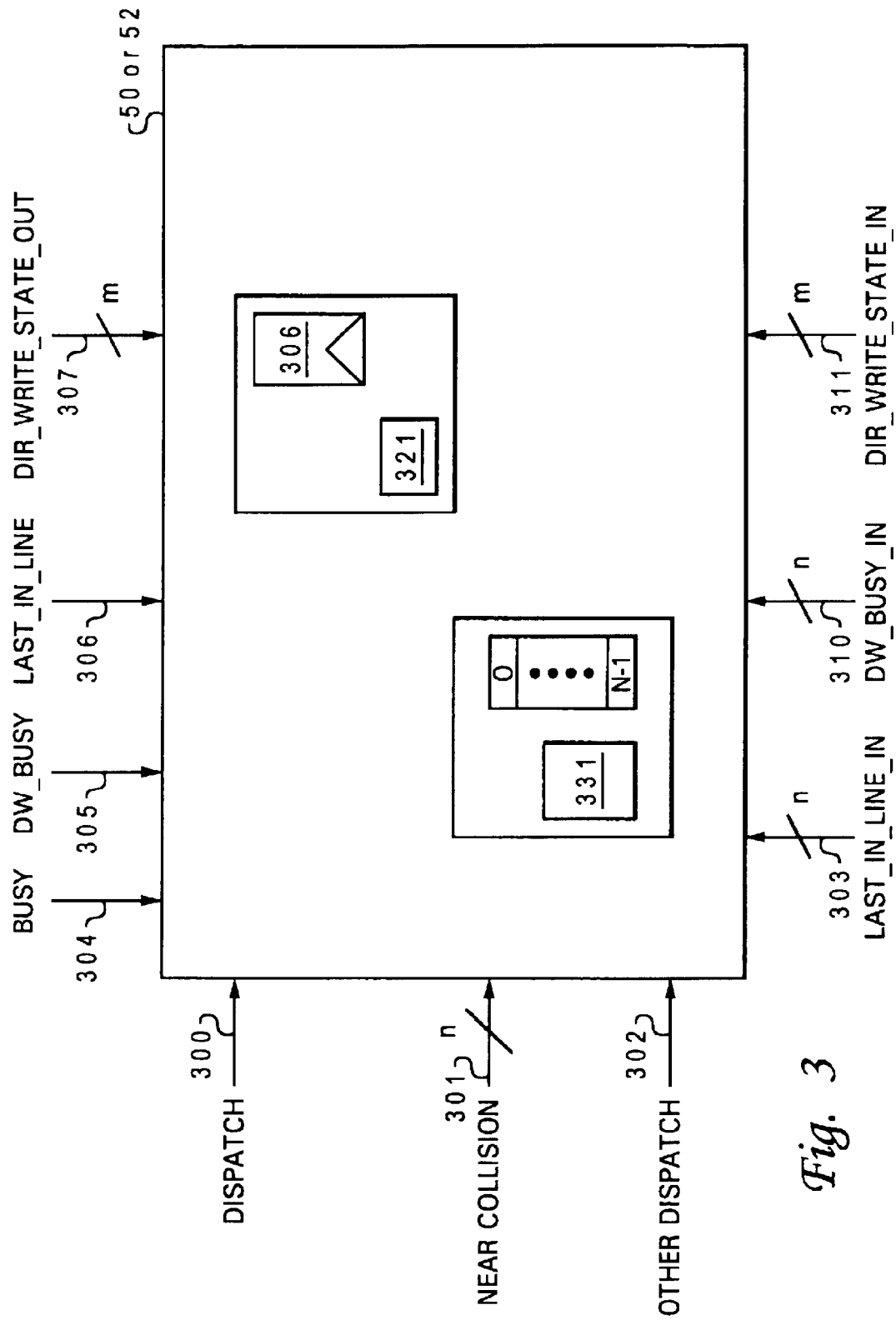
FIG. 3 is a block diagram representation of the state machine for each sector of the multi-sectored cache in accordance with one embodiment of the present invention.

With reference now to FIG. 3 there is shown a representation of a queue in greater detail including various signals and bookkeeping data structures utilized by the present invention. BUSY signal 304 is an indication that the current queue is active and processing an operation. BUSY signal 304 is asserted when the current queue is dispatched and is de-asserted when the current queue has completed processing of the current operation. Likewise, DW_BUSY signal 305 indicates whether the current queue has an outstanding pending operation to update the cache directory array 32. DW_BUSY signal 305 is asserted coincident with BUSY signal 304 and is de-asserted when the cache directory array 32 update is complete. LAST_IN_LINE signal 306 is an indication that the current queue is currently the last queue that has been dispatched to process an operation to the current cache block. LAST_IN_LINE signal 306 is asserted whenever a queue is dispatched since any queue, when dispatching, is, by definition, the last queue to be dispatched to the current cache block. LAST_IN_LINE signal 306 is de-asserted when any other queue is dispatched to operate on a different sector within the current cache block or when the current queue has completed processing and de-asserts BUSY signal 304. LAST_IN_LINE signal 306 is driven by latch 320 controlled by control logic 321 to assert and de-assert LAST_IN_LINE signal 306 as described above.

DIR_WRITE_STATE_OUT signal 307 is a multi-bit signal containing the values the queue will write to cache directory array 32. DIR_WRITE_STATE_OUT signal 307 is asserted to the correct value the first cycle the queue is active and is held to that value during all the cycles that the queue is active. DIR_WRITE_STATE_IN signal 311 is a multi-bit signal indicating, during the cycle DISPATCH signal 300 is asserted, either the current information in cache directory array 32 or the value that will be written to cache directory array 32 by the parent queue, if any. The logic driving DIR_WRITE_STATE_IN signal 311 is described below in conjunction with FIG. 4.

DISPATCH signal 300 is an indication from the dispatch logic that an operation is being dispatched to the current queue. This signal activates the queue to begin processing the operation and therefore causes BUSY signal 304 to be asserted. NEAR_COLLISION signal 301 is a multi-bit signal asserted coincident with DISPATCH signal 300, indicating which other queue or queues, if any, is currently active and processing an operation within the same cache block. Each of the bits within NEAR_COLLISION signal 301 corresponds to one of the queues. A bit within NEAR_COLLISION signal 301 is asserted when the corresponding queue is asserting its BUSY signal 304 and is processing an operation within the same cache block as the operation being dispatched.

LAST_IN_LINE_IN signal 303 is a multi-bit concatenation of LAST_IN_LINE signals 306 from each queue. The logical AND of NEAR_COLLISION signal 301 and LAST_IN_LINE_IN signal 303 during the cycle DISPATCH signal 300 is asserted is formed by control logic 331 and indicates the parent queue, if any, of the current queue. This parent vector is placed in latches 309 and is utilized by the current queue to aid in determining if the parent queue has completed its directory write, thereby enabling the current queue to proceed with it's own directory write. DW_BUSY_IN signal 310 is a multi-bit concatenation of DW_BUSY signals 305 from each queue. The outputs of latches 309 are logically ANDed with multi-bit input DW_BUSY_IN signal 310 to produce a so called "parent done" vector, which, if nonzero, indicates the current parent queue has not completed its directory write. Each queue will only initiate a directory update once the parent done vector is nonzero indicating the parent queue has completed its own directory write.

Figure 4:
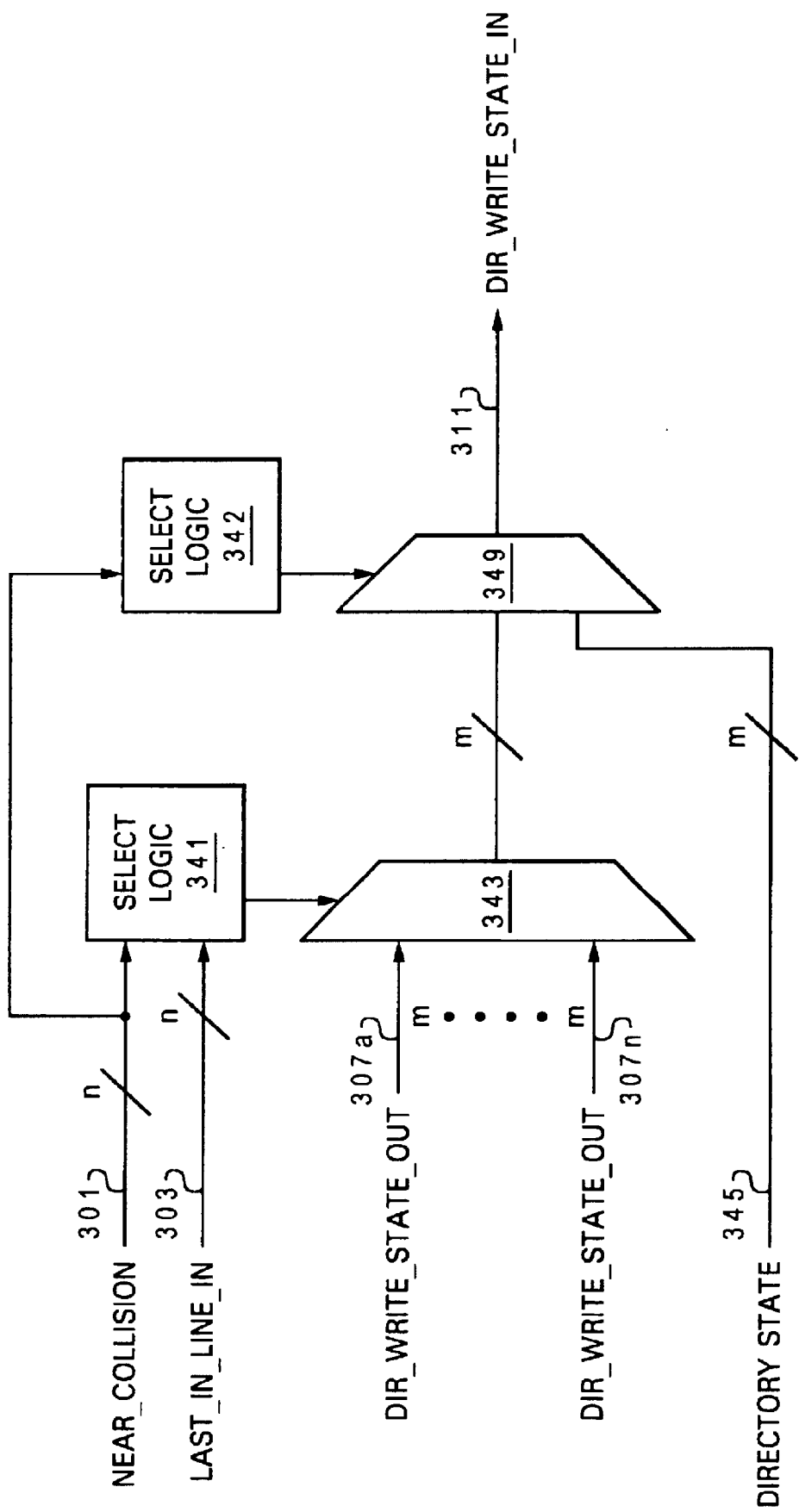
FIG. 4 depicts the logic structure by which the various selection processes that enable accurate directory updates during overlapping accesses to a cache line of the multi-sectored cache according to one embodiment o the present invention.

With reference now to FIG. 4, there is shown the logic driving DIR_WRITE_STATE_IN signal 311. The logic includes MUX 343, which is driven by the various DIR_WRITE_STATE_OUT signals 307 from the various queues. These signals indicate the value to which the given queue will be updating the cache directory array 32. These various signals are multiplexed at MUX 343 under the control of select logic 341. Select logic 341 takes as input NEAR_COLLISION signal 301 and LAST_IN_LINE_IN signal 303 and forms the logical AND of these signals to determine which queue, if any, is the parent queue of the queue currently dispatching. Mux output signal 344 corresponds to the value to be written to the cache directory array 32 by the parent queue, if any, of the currently dispatching queue.

Mux output signal 344 is then further multiplexed with DIRECTORY_STATE signal 345 indicating the current state of the directory for the cache block corresponding to the operation currently being dispatched, under the control of select logic 342. Select logic 342 forms the logical OR of the various bits of NEAR_COLLISION signal 301 to form a single signal indicating whether a collision with another queue in the same cache line has occurred or not. This single signal is used to control MUX 349 to pass through Mux output signal 344 if a collision with another queue has occurred and DIRECTORY_STATE signal 345 if no collision with another queue has occurred. DIR_WRITE_STATE_IN signal 311, therefore, is either the state information that will be written by the parent queue, if any is present, or the current state of cache directory array 32, otherwise. The current queue takes this information and forms a new value driven onto DIR_WRITE_STATE_OUT signal 307 by altering the fields corresponding to the sector being processed by the current queue.

Figure 5:
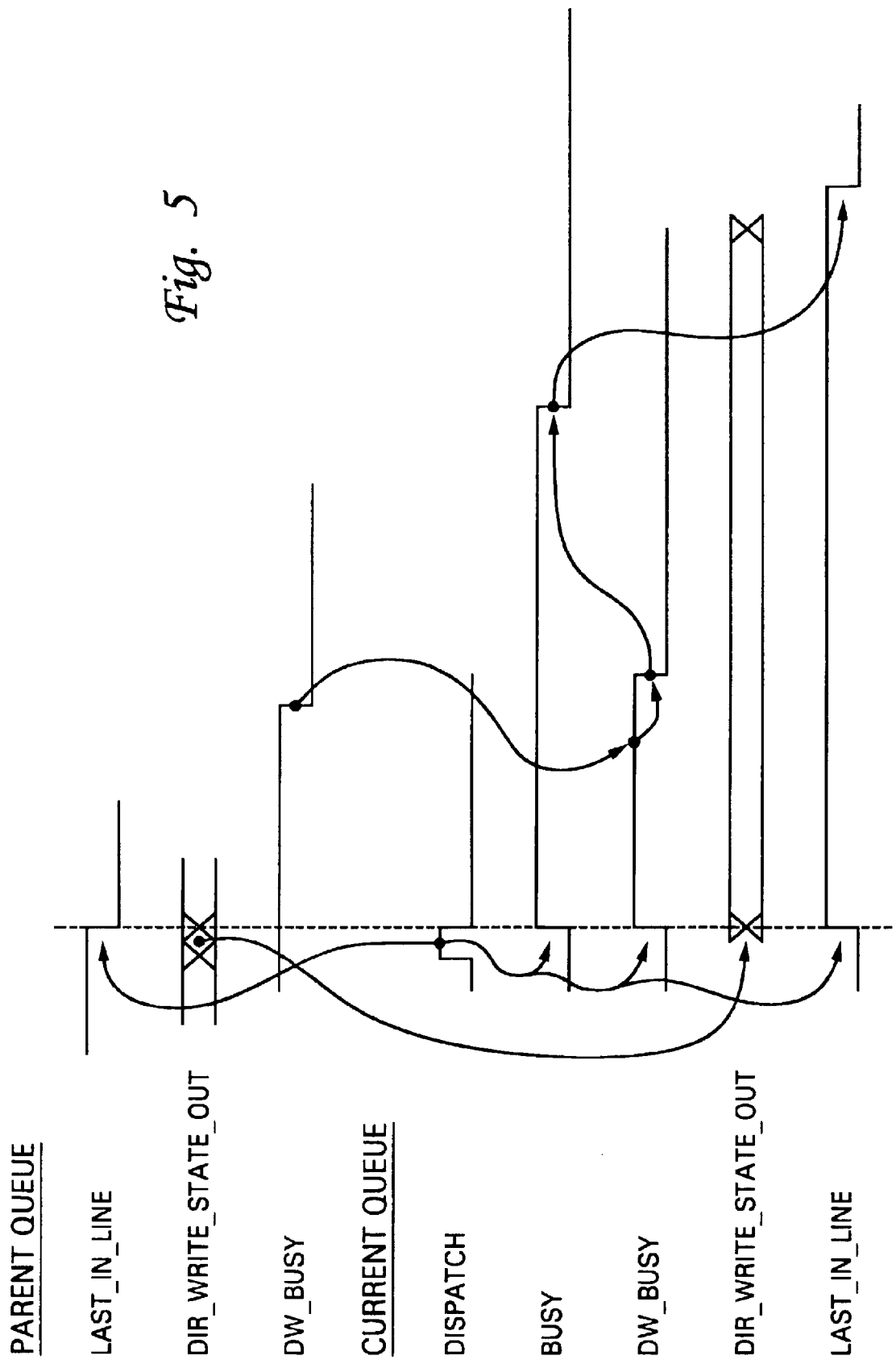
FIG. 5 is a timing diagram illustrating when each stage of the cache access and directory write occurs for two overlapping accesses according to one embodiment of the present invention.

With reference now to FIG. 5, wherein is shown a timing diagram representing the operation of the present invention within a given queue and a corresponding parent queue. Each line of the diagram indicates the assertion and/or de-assertion of one of the above described signal lines for both the parent queue and the current queue. The description, which follows, describes each relevant signal at specific times beginning with the original state of the parent queue. The parent queue initially has last in line signal asserted, the directory write state out busy, and the directory write busy. All of the signal lines for the current queue are in an inactive state.

When the current queue initiates a write access, the dispatch signal is asserted to dispatch the machine. When the dispatch goes off, several signal responses are triggered, as indicated by the cascading arrows. First, BUSY signal and DW_BUSY signal come up. Notably, although DW_BUSY signal is illustrated as being asserted, the DW_BUSY signal does not come up for every operation, just those that need to alter the directory. In addition, dispatch also causes the DIR_WRITE_STATE_OUT signal for the current queue to be updated based on the value of the DIR_WRITE_STATE_OUT signal for the parent queue. Lastly, the current queue raises it's "LAST_IN_LINE" signal and the parent queue lowers its last in line signal.

The content of the directory write state of the parent queue is read by the current queue and updated according to which block of the cache line is being written by the current queue. When the parent queue completes it's directory write, as indicated by the de-assertion of DW_BUSY, the completion signals the current queue that the current queue can now attempt to write the directory. At some later time when that directory write by the current queue completes, the DW_BUSY signal is de-asserted. Once the DW_BUSY signal is de-asserted and the other subtasks within the machine (not shown here) are completed, the operations of the current queue is complete and the current queue de-asserts the busy signal. The de-assertion of the busy signal also cause the LAST_IN_LINE signal for the current queue to be de-asserted as well. It should be noted from the above figure that the LAST_IN_LINE signal de-asserts when either the current queue completes its operation and de-asserts busy or when another queue dispatches to the same cache block.

Figure 6A:
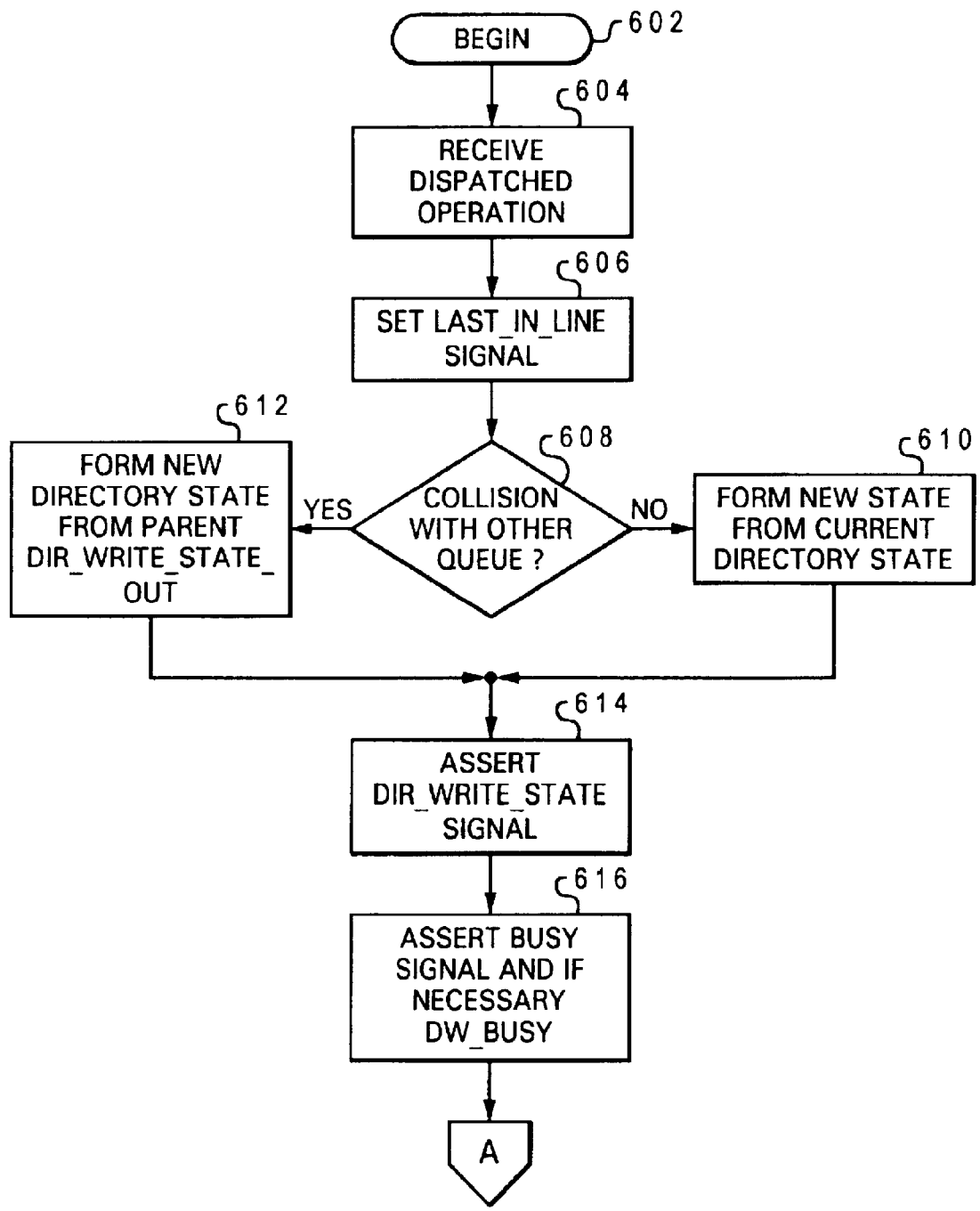
FIG. 6A is a flow diagram depicting the process of selecting a correct directory state to update based on the occurrence or non-occurrence of a collisions with a preceding write accesses in accordance with one embodiment of the present invention.

With reference now to FIG. 6A, there is shown a flowchart illustrating the operation of the queue in accordance with the present invention. The operation begins at block 602 and thereafter proceeds to block 604, which illustrates the queue receiving a dispatch operation. The queue immediately asserts the LAST_IN_LINE signal as shown at block 606. A determination is then made, as depicted at block 608, whether a collision is encountered with another queue accessing the cache line. If no collision exists, the queue forms a new directory state from the current state retrieved from the directory as shown at block 610. Otherwise, a collision exists, and the queue forms the new directory state utilizing the directory state received from the parent DIR_WRITE_STATE_OUT signal as shown at block 612. The queue asserts the DIR_WRITE_STATE_OUT signal as depicted at block 614, and then the queue asserts the BUSY signal and the DW_BUSY signal, if necessary, as indicated at block 616.

Figure 6B:
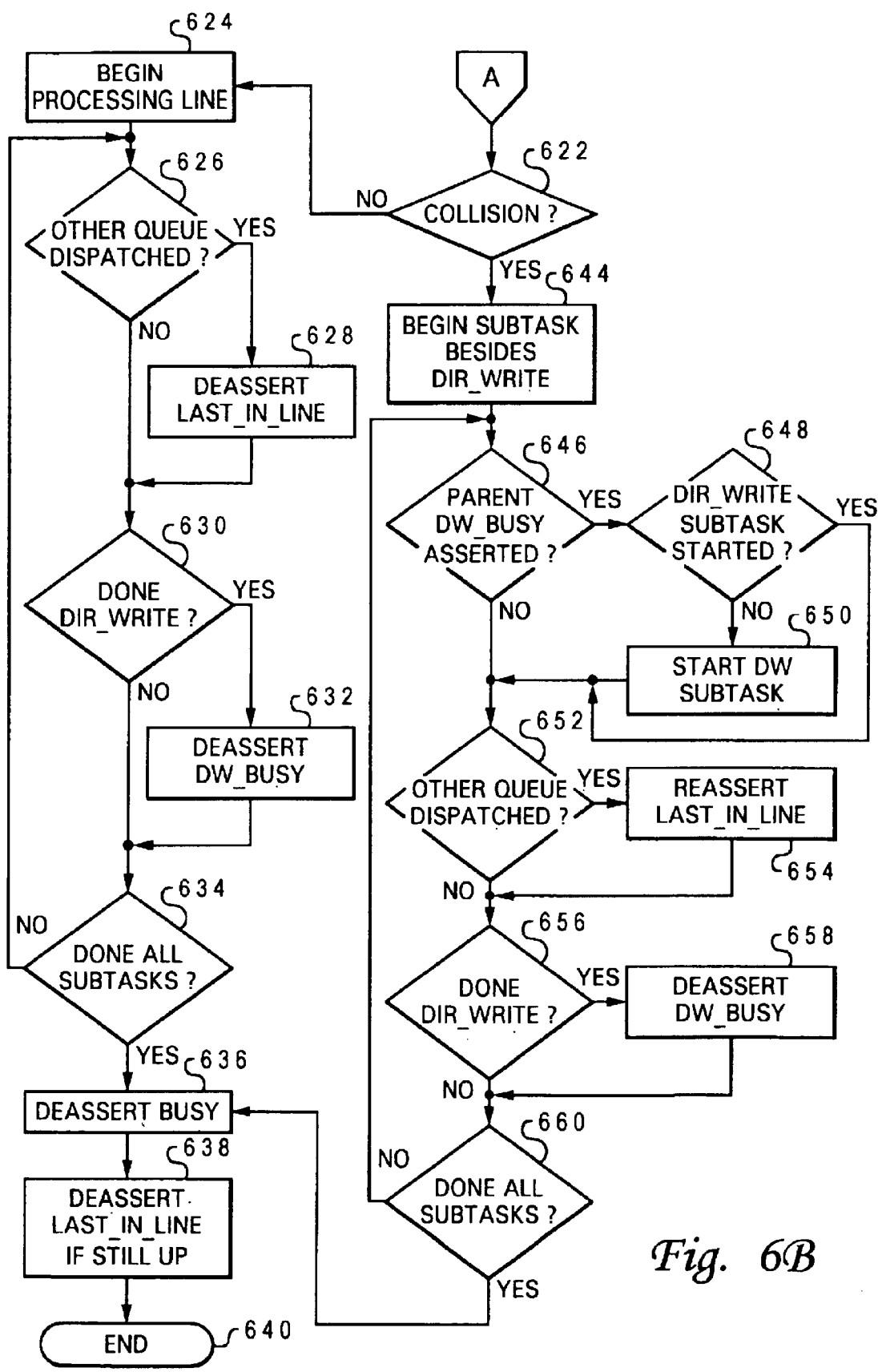
FIG. 6B is a flow diagram depicting the processes of asserting and de-asserting particular signal lines of the state machine to serialize write access by the various queues in correct order and with correct directory information according to one embodiment of the invention.

FIG. 6B provides a more expansive look at the somewhat divergent processes undertaken by the queue based on the whether or not a collision is encountered when a dispatch operation is received. Thus, the process begins with a determination at block 622 whether a collision is encountered. When no collision is encountered, i.e., there is no prior queue still accessing or writing to the cache line and updating the directory, the queue begins processing the line as shown at block 624. A determination is then made at block 626 whether another queue is subsequently dispatched for access to the same line. If another queue is subsequently dispatched, the queue de-asserts the LAST_IN_LINE signal as shown at block 628 and is thereafter considered a parent by the next queue. Following, a check is made whether the queue has completed the directory write as shown at block 630. When the directory write has been completed, the queue de-asserts the DW_BUSY signal as indicated at block 632. A final check is made at block 634 whether all the other subtasks are completed, and once the other subtasks are all completed, the queue de-asserts the BUSY signal as indicated at block 636. If, at this point the LAST_IN_LINE signal is still asserted (i.e., no subsequent queue requested access to the cache line during the update by the current queue), the queue de-asserts the LAST_IN_LINE signal as shown at block 638.

Returning now to the decision block 622, if a collision is encountered when the initial dispatch operation is received and executed, the queue begins all the associated sub-tasks except for the directory write subtask as indicated at block 644. Then, a check is made at block 646 whether the parent has its DW_BUSY signal de-asserted. If the DW_BUSY signal of the parent is de-asserted, a determination is made at block 648 whether the directory write subtasks have started for the queue. If the subtasks have not yet started, the queue starts the directory write subtasks as shown at block 650. With either of the directory write subtasks of the queue started or the directory write of the parent ongoing, a next determination is made at block 652 whether other queues have been dispatched to the current cache block. If another queue has been dispatched, the current queue de-asserts its LAST_IN_LINE signal as depicted at block 654. Then, a check is made at block 656 whether the directory write has completed. When the directory write has completed, a final determination is made at block 660 whether all of the subtasks are completed. If there are still subtasks remaining to be completed, the process cycles back up to block 646 and the sequence of checks and updates completed thereafter. Otherwise, the process proceeds to block 636, at which the BUSY signal is de-asserted.

While the invention has been particularly shown and described with reference to a preferred embodiment, it will be understood by those skilled in the art that various changes in form and detail may be made therein without departing from the spirit and scope of the invention.

What is claimed is:

1. In a data processing system comprising a multi-sectored cache having sectored arrays of cache lines and associated cache directories and a cache controller that includes a plurality of queues for write access to cache lines within sectored arrays, a system for serializing overlapping write access to said arrays to enable accurate directory updates, said system comprising logic for:

issuing a write access request from a first queue for access to a first block of a cache line;

asserting a last in line signal identifying said first queue as a last sequential queue to request access to said cache line;

determining whether a second queue has an outstanding write access request for a second block of said cache line;

responsive to a determination that there are no outstanding write access requests for said cache line, proceeding with a write to said cache line and a corresponding entry of the associated cache directory utilizing current directory information; and responsive to a determination that the second queue has an outstanding write access requests for said cache line:
tracking a completion of said write access and a corresponding write to said associated cache directory;
copying an updated cache directory state from the directory state being written by said second queue; and
modifying said updated cache directory state to reflect a change being made by said write access of said queue; and
storing the modified, updated cache directory state within the associated cache directory.

2. The system of claim 1, further comprising logic for:

de-asserting said last in line signal when a third queue issues a write request for said cache line subsequent to said last in line signal being asserted.

3. The system of claim 1, further comprising logic for:

asserting a BUSY signal when a dispatch operation is issued; and asserting a directory write BUSY signal when said dispatch operation is issued and a directory write operation of said second queue is completed;

wherein said logic further de-asserts said directory write BUSY signal when a directory write of said first queue completed and de-asserts said BUSY signal when all outstanding tasks of said first queue completes.

4. The system of claim 1, wherein said first queue and said second queue are each one of a snoop queue and a write queue.

5. In a data processing system comprising a multi-sectored cache having sectored arrays of cache lines and associated cache directories and a cache controller that includes a plurality of queues for write access to cache lines within sectored arrays, a method for serializing overlapping write access to said arrays to enable accurate directory updates, said method comprising:

issuing a write access request from a first queue for access to a first block of a cache line;

asserting a last in line signal identifying said first queue as a last sequential queue to request access to said cache line;

determining whether a second queue has an outstanding write access request for a second block of said cache line;

responsive to a determination that there are no outstanding write access requests for said cache line, proceeding with a write to said cache line and a corresponding entry of the associated cache directory utilizing current directory information; and responsive to a determination that the second queue has an outstanding write access requests for said cache line:
tracking a completion of said write access and a corresponding write to said associated cache directory;
copying an updated cache directory state from the directory state being written by said second queue; and modifying said updated cache directory state to reflect a change being made by said write access of said queue; and storing the modified, updated cache directory state within the associated cache directory.

6. The method of claim 1, further comprising:

de-asserting said last in line signal when a third queue issues a write request for said cache line subsequent to said last in line signal being asserted.

7. The method of claim 1, further comprising:

asserting a BUSY signal when a dispatch operation is issued; and asserting a directory write BUSY signal when said dispatch operation is issued and a directory write operation of said second queue is completed;

wherein said logic further de-asserts said directory write BUSY signal when a directory write of said first queue completed and de-asserts said BUSY signal when all outstanding tasks of said first queue completes.

8. The method of claim 1, wherein said first queue and said second queue are each one of a snoop queue and a write queue.

* * * * *